United States Patent [19]

Geverink et al.

[11] Patent Number: 4,930,624
[45] Date of Patent: Jun. 5, 1990

[54] CONVEYOR BELT DRIVE SYSTEM

[76] Inventors: Hendrikus J. Geverink, RR#2 (17th Avenue), Markham, Ontario, Canada, L3P 3J3; Leonardus W. Assinck, 132 Manitoba Street, Stouffville, Ontario, Canada, L4A 7Z8

[21] Appl. No.: 366,423

[22] Filed: Jun. 15, 1989

[51] Int. Cl.⁵ .............................................. B65G 23/04
[52] U.S. Cl. ................................................. 198/835
[58] Field of Search ........................ 198/835, 330, 331

[56] References Cited

U.S. PATENT DOCUMENTS

| | | | |
|---|---|---|---|
| 1,499,319 | 6/1924 | Reid, Jr. ................................. | 198/835 |
| 1,706,501 | 3/1929 | Smith ..................................... | 198/835 |
| 3,763,993 | 10/1973 | Whikehart et al. .................... | 198/835 |
| 3,773,167 | 11/1973 | McGinnis ............................... | 198/835 |
| 4,837,067 | 6/1989 | Tschudin-Mahrer ............ | 198/835 X |

FOREIGN PATENT DOCUMENTS

| | | | |
|---|---|---|---|
| 1046969 | 1/1979 | Canada . | |
| 1235096 | 2/1967 | Fed. Rep. of Germany ...... | 198/835 |
| 399433 | 2/1974 | U.S.S.R. ................................ | 198/835 |

Primary Examiner—Robert J. Spar
Assistant Examiner—Cheryl L. Gastineau
Attorney, Agent, or Firm—Riches, McKenzie & Herbert

[57] ABSTRACT

A dual drive conveyor system with improved traction in which two drive pulleys are rotatably coupled together by two drive wheels with one of the drive wheels comprising a resilient deformable wheel and the other comprising a smooth non-deformable wheel. The outer surfaces of the drive wheels permit minor slippage therebetween to compensate for differences in peripheral velocities of the drive wheels and minimize wear of the conveyor belt, drive wheels and drive pulleys.

19 Claims, 4 Drawing Sheets

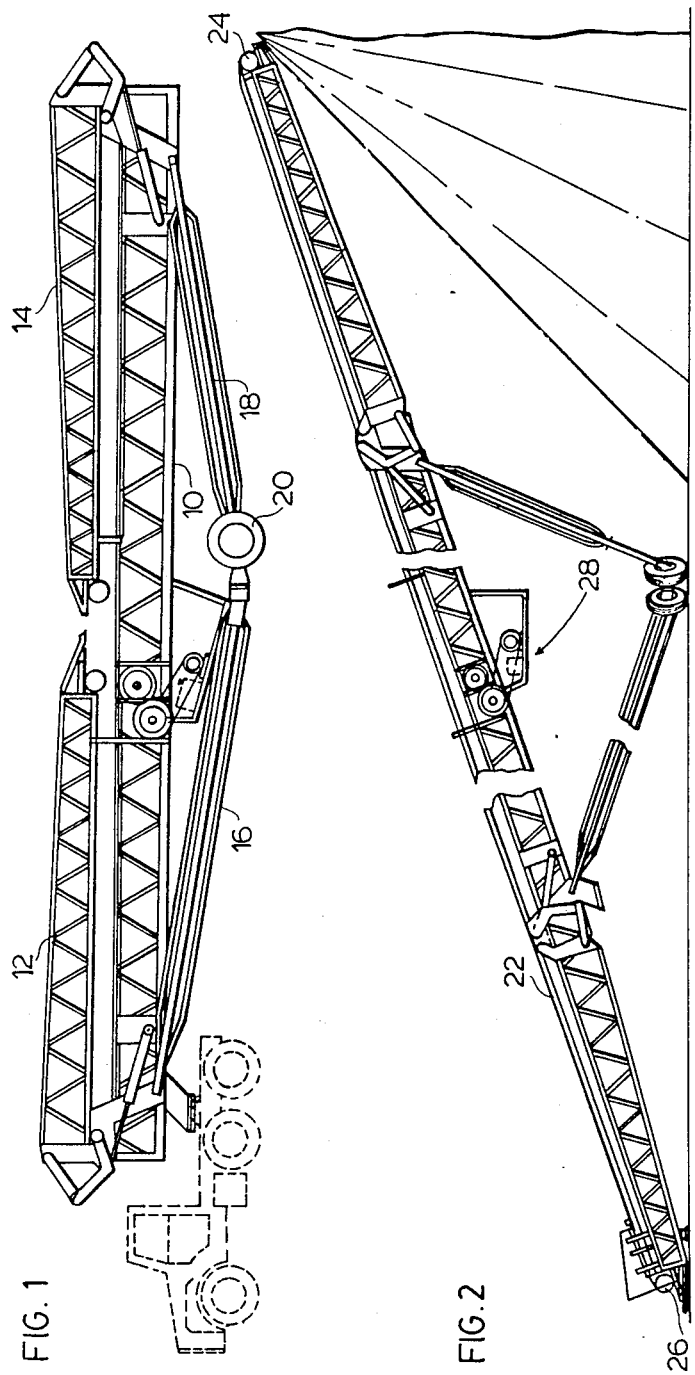

CONVEYOR BELT DRIVE SYSTEM

SCOPE OF THE INVENTION

This invention relates to conveyor systems and more particularly to an improved dual drive system for conveyors in which the conveyor belt drive is located substantially centrally between loading and unloading ends of the conveyor.

BACKGROUND OF THE INVENTION

Conveyor belts are used to transport materials such as aggregates, sand and rock by means of a typically rubber, flat belt from a loading end to an unloading end. The conveyor belts may transport the materials horizontally or may be inclined. A well-known use for conveyor belts is to move the material to an elevated discharge where the materials drop into a pile for storage.

Conventionally, a motor to move the conveyor belt drives a head pulley at the top, unloading end of the conveyor. A snub pulley may be provided in conjunction with the head pulley and can increase belt traction by about 20%. Such snub pulleys are conventionally used in conveyor belt systems with high capacities, for example, 400 tons per hour and over. With the drive mounted at the top end of the conveyor, the conveyor belt with the transported material on it is pulled by the head pulley and the belt will tension itself thereby giving good traction on the driving head pulley. In contrast, if the drive is mounted in a return pass of the belt as, for example, at the tail pulley, then the driving tail pulley will have to push the belt. The disadvantage arises that the belt may slacken and slip on the driving tail pulley.

Belt conveyor systems are known in which the drive pulley cannot conveniently be located as the head pulley at the top of a conveyor. One well-known such system is a portable conveying system known as portable radial stackers which are to be transported on the highways. Such stackers typically comprise a conveyor system with three sections, namely, a centre section plus head and tail sections which may be folded up over the centre section to permit the portable stacker to be folded up and travel on a highway within legal transport limits. Such a portable radial stacker is disclosed in CP 1,046,969 issued Jan. 23, 1979. In such portable radial stackers the drive mechanism is advantageously mounted in the centre section to assist in reducing the height of the stacker when folded and to reduce the weight of the head section thus decreasing the size and strength of mechanisms to pivot and support the head section.

It is known in such portable radial stackers to use a dual drive system in which two drive pulleys are provided in a centre section close to each other with the belt passing about one drive pulley and then about the other so as to describe a substantially S-shape in side view.

Dual drive systems are also useful in stationary conveyors and stationary stockpiling stackers. Utilizing a dual drive system somewhere in the centre of a stacker reduces the weight or cantilever load at the head section and, where typical cable suspension support systems are used, helps to reduce winch size and the size of wire rope support cables. Reduced weight also helps to reduce side swaying of the conveyor head section, especially on long, tall cable suspended stackers. The dual drive system is advantageous for any stationary or portable conveyor to be used in limited spaces, for example, in buildings with low clearance. The dual drive system can replace a conventional head pulley drive system and reduce the height of the conveyor in use. Location of the dual drive system in the centre section of the conveyor provides easier access for maintenance and servicing.

In a typical configuration for a dual drive system, a drive motor turns one of the drive pulleys which includes a first pneumatic rubber drive wheel to engage a second pneumatic rubber drive wheel coupled to the other of the drive pulleys. Rotational forces from the motor driving the first drive pulley are transferred via the two frictionally engaging pneumatic rubber tires to drive the other drive pulley. Such configurations suffer a number of disadvantages. One disadvantage is that in forcing the two pneumatic rubber tires into each other as is necessary to minimize slippage, the rubber faces of the tires flex and fight each other causing uneven and premature tire wear. Another disadvantage is that damp sand and fine silts do build up or accumulate on the face of the drive pulley which contacts the load carrying surface of the conveyor belt. This increases the diameter of this pulley slightly and therefore disadvantageously changes the speed at which this drive pulley drives the belt to be different than the speed of the other drive pulley. This difference in speed transfers friction to the two pneumatic rubber drive wheels, resulting in different speeds for the drive wheels and premature tire wear.

SUMMARY OF THE INVENTION

To at least partially overcome the disadvantages of previously known devices, the present invention provides an improved dual drive conveyor system in which two drive pulleys are rotatably coupled together by two drive wheels with one of the drive wheels comprising a resilient deformable wheel and the other comprising a rigid non-deformable wheel.

An object of the present invention is to provide an improved conveyor system and particularly an improved portable radial stacker utilizing dual drive pulleys coupled by drive wheels which reduce wear of the drive wheels.

Another object is to provide a dual drive conveyor system which permits different speeds of rotation of each drive pulley.

Accordingly, in one of its aspects, the present invention provides a conveyor system comprising a flexible continuous conveyor belt having a face surface and a back surface, and in which:

the belt is driven in a continuous loop by juxtapositioned first and second drive pulley engaging the belt, the first pulley means rotating in a direction opposite to the direction of rotation of the second pulley means, the belt passing about the first drive pulley means with the back surface in engagement therewith, then passing about the second pulley means with the face surface in engagement therewith, first drive wheel means coupled to the first drive pulley means for rotation therewith and having peripheral outer first engagement surfaces, second drive wheel means coupled to the second drive pulley means for rotation therewith and having peripheral outer second engagement surfaces, means to rotate one of the first and second drive pulley means, and the first and second drive wheel means coupled for rotation together by the first engagement surfaces frictionally engaging the second engagement surfaces, the improvement wherein:

one of the first and second engagement surfaces comprising a resilient, deformable surface and the other of the first and second engagement surfaces comprising a rigid non-deformable surface, and the first and second engagement surfaces permit minor slippage therebetween to compensate for differences in peripheral velocities of the first and second engagement surfaces.

In another aspect the present invention provides a conveyor system comprising a flexible continuous conveyor belt driven in a continuous loop between a loading first end and an unloading second end, the belt carrying material from the first end to the second end in a loaded pass and returning in a return pass, drive means to drive the conveyor belt including juxtapositioned first and second drive pulley means engaging the conveyor belt in the return pass between the first and second ends, the first and second drive pulley means rotating in opposite directions with the belt passing about one of the drive pulley means then back about the other drive pulley means to describe a substantially S-shape as seen in side view, first drive wheel means coupled to the first drive pulley means for rotation therewith, second drive wheel means coupled to the second drive pulley means for rotation therewith, means to rotate the first drive pulley means, peripheral outer surfaces of the first drive wheel means frictionally engaging peripheral outer surfaces of the second drive wheel means to rotate the second drive wheel means and thereby the second drive pulley means on rotation of the first drive wheel means, means to adjustably move the first and second drive wheel means towards and away from each other, and one of said first and second drive wheel means having an outer diameter which is adjustable.

In accordance with the present invention, a dual drive pulley system is provided in which two drive wheels couple the two drive pulleys together, with one wheel having a deformable surface, such as a tire and the other wheel having a smooth, non-deformable surface.

In one preferred embodiment, the outer surfaces of the drive wheels permit minor slippage therebetween to compensate for minor differences in peripheral velocities of the wheels. In another embodiment, means are provided to move the drive wheels apart and increase the diameter of one drive wheel a small amount to assist in keeping peripheral speeds of the drive wheels equal.

BRIEF DESCRIPTION OF THE DRAWINGS

Further aspects and advantages of the present invention will occur from the following description taken together with the accompanying drawings in which:

FIG. 1 is a side view of a known portable radial stacker in accordance with the present invention in a folded, travelling position;

FIG. 2 is side view of the portable radial stacker of FIG. 1 in an unfolded operative position;

DETAILED DESCRIPTION OF THE DRAWINGS

Figure 3:
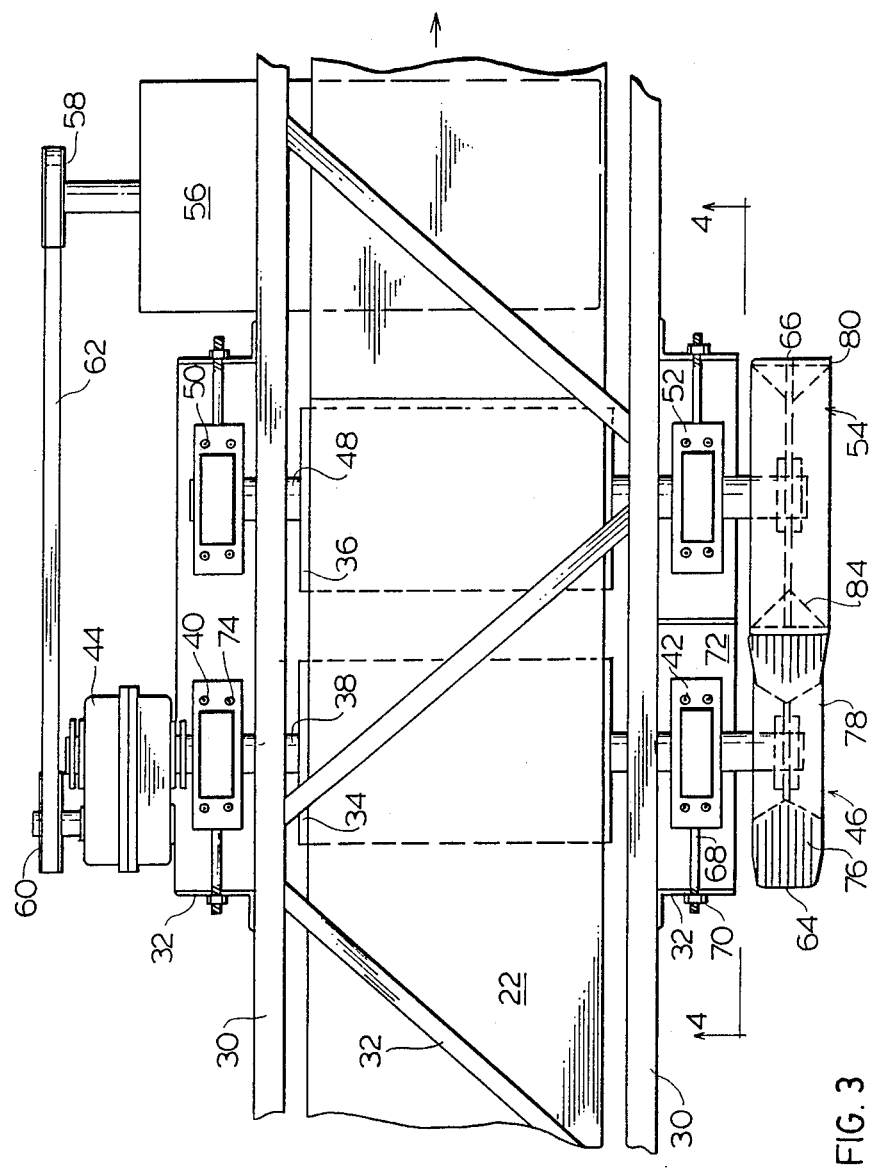
FIG. 3 is partially cut-away plan view of the stacker of FIG. 2 showing the drive mechanism.

Reference is made first to FIGS. 1 and 2 which show a portable radial stacker of the type described in Canadian Patent No. 1,046,967. The stacker has a centre section 10 which has hinged at its rear a tail section 12 and has hinged at its front a head section 14. The centre section is supported on a non-telescopic support arm 16 and a telescopic support arm 18 coupled to carriage wheels 20. A continuous loop flexible conveyor belt 22 passes from head pulley 24 to tail pulley 26. A belt scraper (not shown) may be mounted near the head pulley.

When in use, as seen in FIG. 2, materials are loaded onto the conveyor belt at the tail pulley 26 and the conveyor belt moves in a loaded pass upwardly to the head pulley 24 where the material is discharged. The conveyor belt 22 then returns in a return pass to the tail pulley. A drive mechanism generally indicated 28 is carried by the centre section.

As is to be appreciated, FIG. 2 shows the stacker in the unfolded position for use. FIG. 1 shows the stacker in a folded position for transport with the head section 14 and tail section 12 folded on top of the centre section 10.

Figure 4:
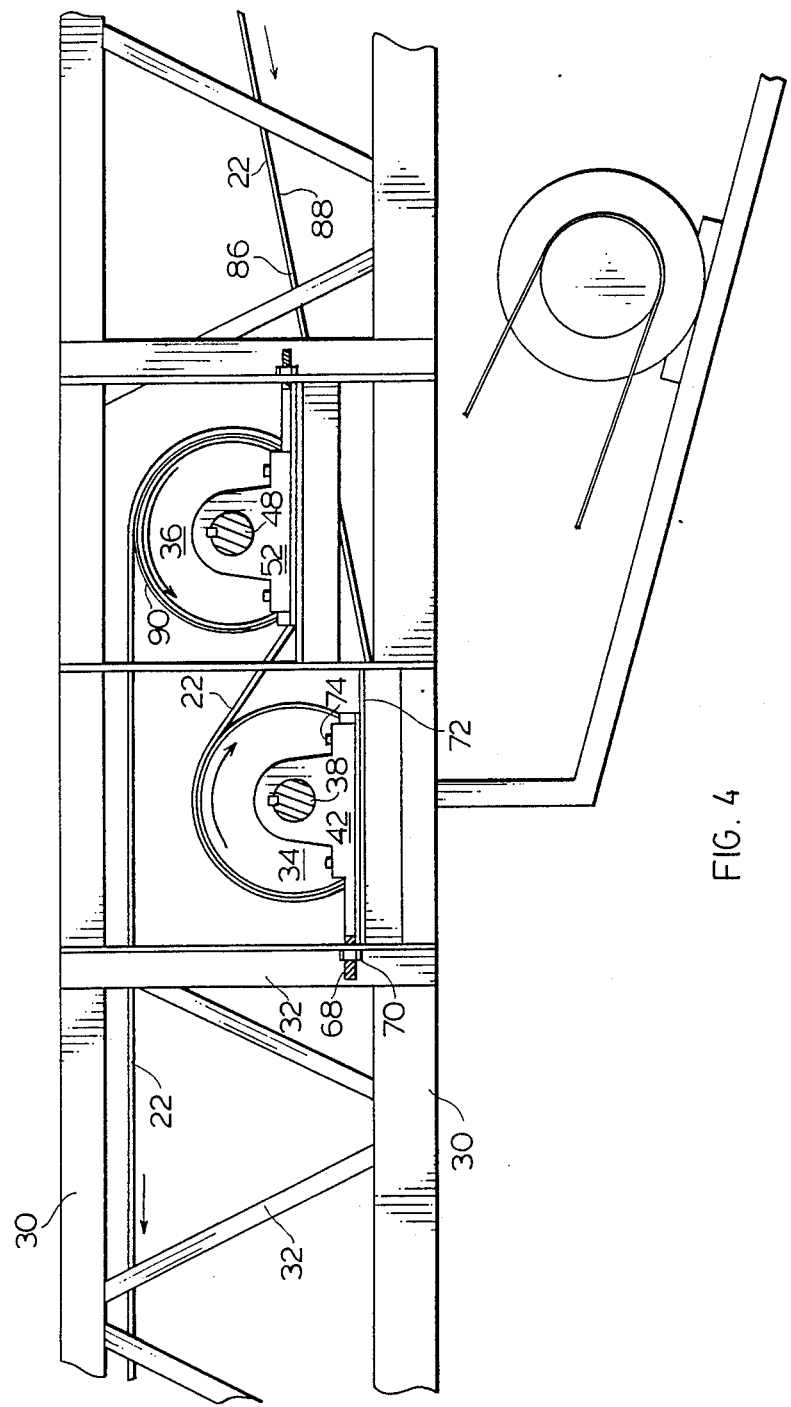
FIG. 4 is a side view of the drive mechanism of FIG. 3 as seen from Section IV—IV' as marked on FIG. 3.
Figure 5:
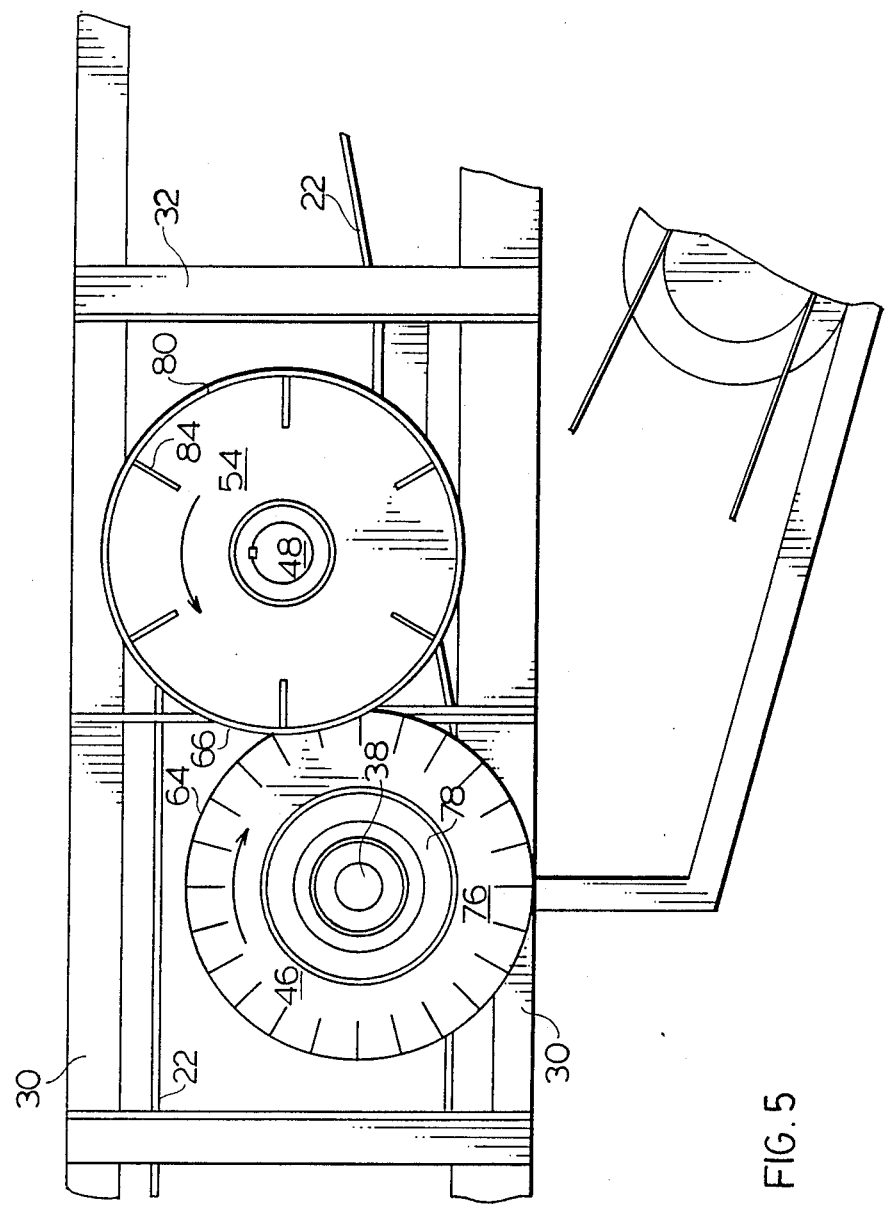
FIG. 5 is a side view of the drive mechanism of FIG. 3.

Reference is now made to FIGS. 3 to 5 particularly showing the drive mechanism. As seen in the figures, the centre section comprises a rectangular truss with the longitudinal corner members of the truss generally indicated 30 and cross-members generally indicated 32. A first drive pulley 34 and second drive pulley 36 are mounted into the centre section 10 with the drive belt 22 to pass from the head pulley 24 rearward below the drive pulley 36 to the first drive pulley 34. The belt 22 engages the first drive pulley 34 passing rearwardly and upwardly on the first drive pulley 34 then forwardly to engage the underneath of the second drive pulley 36. Belt 22 then proceeds forwardly and upwardly then rearwardly on the second drive pulley 36 to the tail pulley 26.

First drive pulley 34 is fixed on a first shaft 38 which is journalled near each of its ends in journal boxes 40 and 42. At one end, the first shaft is fixed to the output of a speed reducing gearbox 44. At its other end, first shaft 38 has fixedly attached thereto a first drive wheel 46.

Second drive pulley 36 is fixedly mounted on a second shaft 48 similarly journalled in two journal boxes 50 and 52 and has at one end a second drive wheel 54 fixed to the second shaft 48.

A drive motor is schematically shown as 56 providing as its output a motor sheave 58 transferring power to an input drive sheave 60 of the gearbox via drive belt 62.

In operation, motor 56 drives the gearbox which in turn drives first shaft 38 and first drive pulley 34 and first drive wheel 46 fixedly coupled thereto.

The outer peripheral surfaces 64 of the first drive wheel 46 frictionally engage the outer peripheral surface 66 of the second drive wheel 54 whereby rotation of the first drive wheel 46 cause rotation of the second drive wheel 54 together with second shaft 48 and second drive pulley 36 fixedly attached thereto.

As best seen in FIG. 5, the first shaft 38 and the second shaft 48 are located so that the first drive wheel 46 is forced into the second drive wheel 54 to frictionally engage the same. Means are provided to adjustably locate the journal boxes relative to each other which adjusts the distance between centers of shafts 38 and 48 and can permit adjustment of the forces with which the two drive wheels are forced together. As seen in FIGS. 3 and 4, each journal box carries a threaded rod-like extension 68 coupled to a vertical support 32 so that by turning an associated nut 70 the journal boxes may be slid forward or rearwardly along their respective support plates 72. Four locking bolts 74 are provided to slide in slots on plates 72 and assist in locking the journal boxes at a desired location. Adjustment of the journal boxes also assist in aligning the first and second drive pulleys parallel to each other.

Separate means can be provided at either the head or the tail pulley to longitudinally tension the conveyor belt 22.

As seen in FIGS. 3 and 5, the first drive wheel 46 preferably comprises a conventional pneumatic automotive tire 76 received on a central metal hub 78 and inflated to a desired pressure.

Second drive wheel 54 is shown to comprise a peripheral band of rolled metal plate 80 mounted on a radially extending circular hub with spaced reinforcing radially extending flanges 84. The first and second drive wheels are shown to be of the same diameter and the diameter of the first and second drive pulleys are also shown to be equal. Alternately, the ratio of the diameter of the first drive wheel to the first drive pulley may be the same as the ratio of the diameters of the second drive wheel to the second drive pulley.

First drive pulley 34 drives against the clean, back side 86 of rubber drive belt 22. Second drive pulley 36 drives against the dirty, face side 88 of rubber drive belt 22. Depending on what type of materials are conveyed, the belt scraper mounted at the head pulley will not remove all the fine silt type of deposits on the belt and such materials will, to varying degrees, stick or adhere to second drive pulley 36 which is in contact with dirty, face side 88 of the belt. For example, damp sand and fine silts in the materials will readily accumulate on the peripheral surface of second drive pulley 36 as a thin layer schematically shown as 90 in FIG. 4. This has the result of increasing the effective diameter of second drive pulley 36 by twice the thickness of this layer. With operation through changing conditions the thickness of layer 90 may increase or decrease with a resultant relative change of the diameter of the second drive pulley 36.

The increase in diameter of the second drive pulley 36 changes the rotational speed of the second drive pulley relative to the first drive pulley 34. By example, assume that both drive pulleys are designed to rotate at an identical speed of 100 r.p.m. when layer 90 does not exist. Assuming then than a layer 90 forms on the second drive pulley 36 and that there is no slippage of either drive pulley on belt 22, then the first drive pulley 34 continues to rotate at 100 r.p.m. but the second drive pulley 36 whose effective diameter has increased rotates at a lower speed, say 98 r.p.m. In accordance with the present invention, it has been found that the use of a smooth, non-deformable second drive wheel 54 permits minimal slippage between the two drive wheels sufficient to compensate for small differences in speed of their peripheral surfaces without undue wear of the drive wheels or pulleys. The hard, non-deformable smooth surface of the second drive wheel 54 will compensate for the drag of the first drive wheel 46 on the second drive wheel 54 without any noticeable wear. In field testing, after one year of operation of a dual drive in accordance with the invention, the deformable first drive wheel and conveyor belt did not show any sign of wear. In contrast, when a conventional dual drive was used, with two deformable pneumatic tires as drive wheels, after one year of field use, the tire treads had worn completely and the belt was also showing signs of wear.

The use of the rubber tire drive wheel and steel wheel drive combination has been found to substantially reduce the wear of the rubber drive wheel. Where two rubber drive wheels have been used, the engaging surfaces of the rubber wheels have been found to flex and fight each other in a manner which results in uneven and premature tire wear as well as increased friction and wear between belt 22 and drive pulleys 34 and 36. In contrast, use of a single pneumatic drive wheel against the solid flat metal face of the non-deformable drive wheel has resulted in more constant fixed compression of the single tire drive wheel giving better traction and uniform, decreased belt, drive pulley and tire wear.

The conveyor in accordance with the present invention has also, surprisingly, been found to increase the overall traction of the drive pulleys. The use of a rubber tire drive wheel with a steel drive wheel has also been found to increase the traction of the drive pulleys by about 100% compared with the use of only one drive pulley located at the head end or any place in the centre of conveyor section with a snub pulley. Particularly, during severe weather conditions of either cold or wet, a conveyor belt with the improved drive system of the present invention has been found to be able to start up and operate under severe material loads in which systems with only one drive and a snub pulley would slip and not start or operate.

The conveyor system in accordance with the preferred embodiment of the present invention advantageously also provides means to adjust the relative diameters of the drive wheels and pulleys to compensate for the build up of layer 90. By adjustment of the location of journal boxes 40, 42, 50 and 52, the distance between centers of drive wheels 46 and 54 can be varied. By increasing or decreasing the air pressure in tire 76 of first drive wheel 46, the diameter of the first drive wheel can, to a small extent, be varied. Relative adjustment of the distance between centers of the drive wheels 46 and 54 together with increase or decrease of the diameter of the first drive wheel 46 by varying its degree of inflation permits variation of the diameter of the first drive wheel. Changing the diameter of the first drive wheel 46 to maintain a ratio of the diameter of the first drive wheel to the effective diameter of the first drive pulley to be equal to a ratio of the diameter of the second drive wheel to the diameter of the second drive pulley will permit the drive wheels to rotate at the same peripheral velocity.

A preferred variable-diameter, deformable wheel for use in the present invention is a conventional automotive wheel utilizing a conventional pneumatic automotive tire. Such tires utilize resilient elastomeric material and are provided with a pneumatic valve whereby the pressure in the tire may be varied to adjust the pressure, the drive wheels are urged together and/or to change the diameter of the tire. Other inflatable tires could be used with the degree of inflation controlling diameter. It is to be appreciated that non-variable diameter, deformable wheels can be used including substantially rigid wheels with a sufficiently thick outer surface of resilient elastomeric material.

The non-deformable wheel has been described as preferably having a smooth, cylindrical outer metal surface. Rigid surfaces of, for example, non-shrinking, non-deformable materials other than metal may be utilized. The peripheral outer surface 66 of the second drive wheel 54 is preferably smooth and flat as shown.

In the preferred embodiments of the invention, for the best results, the first drive wheel 46 has been shown as the resilient, deformable wheel and the second drive wheel 54 has been shown as the non-deformable wheel. This could be reversed with the second drive wheel 54 comprising the deformable wheel.

While not shown, the two drive pulleys may preferably comprise metal drums with a layer of grooved elastomeric rubber covering their surfaces with the conveyor belt.

While the invention has been described with reference to a preferred embodiment, the invention is not so limited. Many variations and modifications will now occur to persons skilled in the art. For a definition of the invention, reference is made to the following claims.

What we claim is:

1. In a conveyor system comprising a flexible continuous conveyor belt having a face surface and a back surface, and in which:
   the belt is driven in a continuous loop by juxtapositioned first and second drive pulley engaging the belt,
   the first pulley means rotating in a direction opposite to the direction of rotation of the second pulley means,
   the belt passing about the first drive pulley means with the back surface in engagement therewith, then passing about the second pulley means with the face surface in engagement therewith,
   first drive wheel means coupled to the first drive pulley means for rotation therewith and having peripheral outer first engagement surfaces,
   second drive wheel means coupled to the second drive pulley means for rotation therewith and having peripheral outer second engagement surfaces,
   means to rotate one of the first and second drive pulley means, and
   the first and second drive wheel means coupled for rotation together by the first engagement surfaces frictionally engaging the second engagement surfaces,
   the improvement wherein:
   one of the first and second engagement surfaces comprising a resilient, deformable surface and the other of the first and second engagement surfaces comprising a rigid non-deformable surface, and
   the first and second engagement surfaces permit minor slippage therebetween to compensate for differences in peripheral velocities of the first and second engagement surfaces.

2. An improved conveyor system as claimed in claim 1 wherein said non-deformable surface is smooth.

3. An improved conveyor system as claimed in claim 2 wherein said deformable surface comprises an elastomeric material.

4. A conveyor system comprising a flexible continuous conveyor belt driven in a continuous loop between a loading first end and an unloading second end,
   the belt carrying material from the first end to the second end in a loaded pass and returning in a return pass,
   drive means to drive the conveyor belt including juxtapositioned first and second drive pulley means engaging the conveyor belt in the return pass between the first and second ends,
   the first and second drive pulley means rotating in opposite directions with the belt passing about one of the drive pulley means then back about the other drive pulley means to describe a substantially S-shape as seen in side view,
   first drive wheel means coupled to the first drive pulley means for rotation therewith,
   second drive wheel means coupled to the second drive pulley means for rotation therewith,
   means to rotate the first drive pulley means,
   peripheral outer surfaces of the first drive wheel means frictionally engaging peripheral outer surfaces of the second drive wheel means to rotate the second drive wheel means and thereby the second drive pulley means on rotation of the first drive wheel means,
   one of the first and second drive wheel means comprising resilient, deformable wheel means and the other of the first and second drive wheel means comprising rigid non-deformable wheel means, and
   the peripheral outer surfaces of the first drive wheel means and the peripheral outer surfaces of the second drive wheel means permitting slippage therebetween to compensate for minor differences in the peripheral velocities of the first drive wheel means and second drive wheel means.

5. A conveyor system as claimed in claim 4 wherein the peripheral outer surfaces of the non-deformable wheel means are smooth.

6. A conveyor system as claimed in claim 5 wherein the peripheral outer surfaces of the deformable wheel means comprise resilient elastomeric material.

7. A conveyor system as claimed in claim 6 wherein the non-deformable wheel means comprises the first drive wheel means.

8. A conveyor system as claimed in claim 7 wherein the peripheral outer surfaces of the non-deformable wheel means comprise metal.

9. A conveyor system as claimed in claim 7 wherein the deformable wheel means comprises an inflatable tire of elastomeric material.

10. A conveyor system as claimed in claim 6 including means to adjustably move the first and second drive wheel means towards and away from each other and wherein said deformable wheel means has an outer diameter which is adjustable.

11. A conveyor system as claimed in claim 7 wherein the first drive pulley means and the first drive wheel means are affixed to a common journalled first shaft, the second drive pulley means and the second drive wheel means are affixed to a common journalled second shaft, said means to rotate the first drive pulley means is coupled to the first shaft, and said deformable wheel means comprise an inflatable tire of elastomeric material with the tire having a diameter which varies with inflation of the tire.

12. A conveyor system as claimed in claim 11 wherein said first shaft is journalled in two journal box means, one proximate each of a first and a second end of the first shaft, said second shaft is journalled in two journal box means, one proximate each of a first and a second end of the second shaft, means to adjustably move the journal box means of the first and second shafts at the respective first ends thereof towards and away from each other; and means to adjustably move the journal box means of the first and second shafts at the respective second ends thereof towards and away from each other.

13. A conveyor system as claimed in claim 9 wherein the ratio of a diameter of the first drive wheel means to a diameter of the first drive pulley means is substantially the same as the ratio of a diameter of the second drive wheel means to a diameter of the second drive pulley means 14. A conveyor system as claimed in claim 13 wherein the diameter of the first drive pulley means is substantially equal to the diameter of the second drive pulley means.

15. A conveyor system as claimed in claim 9 wherein:

the belt has a face side carrying the material and a back side, the first drive pulley means engaging the back side of the belt and the second drive pulley engaging the face side of the belt.

16. A method of operating a conveyor system, wherein said conveyor system comprises:

a flexible continuous conveyor belt driven in a continuous loop between a loading first end and an unloading second end, the belt carrying material from the first end to the second end in a loaded pass and returning in a return pass, the belt having a face side carrying the material and a back side, drive means to drive the conveyor belt including closely positioned first and second drive pulley means engaging the conveyor belt in the return pass between the first and second ends, the first and second drive pulley means rotating in opposite directions, the belt passing about the first drive pulley means with the back side in engagement therewith and then passing about the second drive pulley means with the face side in engagement therewith, first drive wheel means coupled to the first drive pulley means for rotation therewith, second drive wheel means coupled to the second drive pulley means for rotation therewith, means to rotate one of the first and second drive pulley means, peripheral outer surfaces of the first drive wheel means frictionally engaging peripheral outer surfaces of the second drive wheel means so that the first and second drive wheel means rotate together, one of the first and second drive wheel means comprising resilient, deformable wheel means and the other of the first and second drive wheel means comprising rigid non-deformable wheel means, the deformable wheel means having an outer diameter which is adjustable, and means to adjustably move the first and second wheel means towards and away from each other, the method wherein first and second wheel means are moved towards and away from each other and the diameter of the deformable wheel means is adjusted so as to maintain a ratio of a diameter of the first drive wheel means to an effective diameter of the first drive pulley means to be substantially identical to a ratio of a diameter of the second drive wheel means to a diameter of the second drive pulley means, wherein the effective diameter of the second drive pulley means equals a diameter of the second drive pulley means plus twice the thickness of any layer of said material which becomes adhered on the second drive pulley means between the second drive pulley means and the face side of the belt.

17. In a conveyor system comprising a flexible continuous conveyor belt having a face surface and a back surface, and in which:

the belt is driven in a continuous loop by juxtapositioned first and second drive pulley engaging the belt, the first pulley means rotating in a direction opposite to the direction of rotation of the second pulley means, the belt passing about the first drive pulley means with the back surface in engagement therewith, then passing about the second pulley means with the face surface in engagement therewith, first drive wheel means coupled to the first drive pulley means for rotation therewith and having peripheral outer first engagement surfaces, second drive wheel means coupled to the second drive pulley means for rotation therewith and having peripheral outer second engagement surfaces, means to rotate one of the first and second drive pulley means, and the first and second drive wheel means coupled for rotation together by the first engagement surfaces frictionally engaging the second engagement surfaces, the improvement wherein:

one of the first and second engagement surfaces comprising a resilient, deformable surface and the other of the first and second engagement surfaces comprising a rigid non-deformable surface.

18. An improved conveyor system as claimed in claim 7 wherein said non-deformable surface is smooth.

19. An improved conveyor system as claimed in claim 18 wherein said deformable surface comprises an elastomeric material.

* * * * *